(No Model.)
J. JEFFERSON.
MEAT TENDERER.
No. 487,672. Patented Dec. 6, 1892.
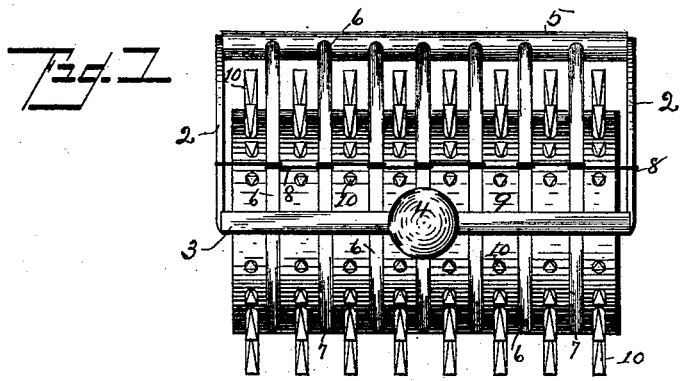
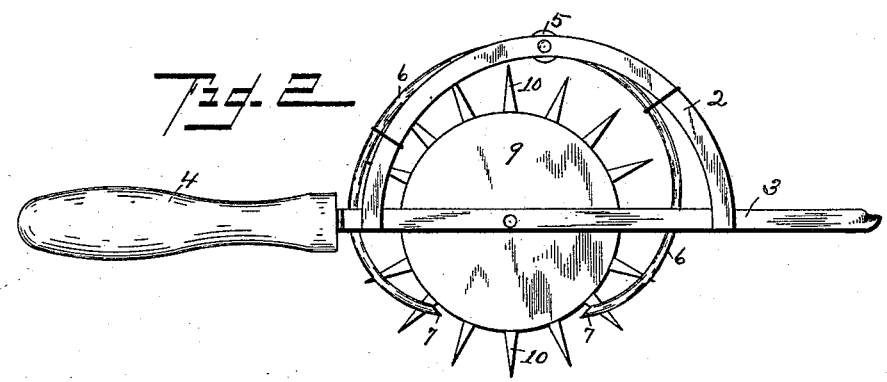
WITNESSES
John Jefferson
INVENTOR
By Hopkins & Atkins
Attorneys

UNITED STATES PATENT OFFICE.

JOHN JEFFERSON, OF COLUMBUS, ASSIGNOR OF ONE-HALF TO HENRY HILL, OF MARION, OHIO.

MEAT-TENDERER.

SPECIFICATION forming part of Letters Patent No. 487,672, dated December 6, 1892.

Application filed June 6, 1892. Serial No. 435,669. (No model.)

*To all whom it may concern:*

Be it known that I, JOHN JEFFERSON, of Columbus, in the county of Franklin, State of Ohio, have invented certain new and useful Improvements in Meat-Tenderers, of which the following is a specification, reference being had to the accompanying drawings.

The object of the invention is to produce an improved form of meat-tenderer for cutting the fibers and separating them, so as to render them more readily masticated and digested, allowing the seasoning to permeate thoroughly and not mutilating.

In the accompanying drawings, Figure 1 is a front elevation of my meat-tenderer, showing the rotary form thereof. Fig. 2 is a side elevation of the same.

Referring to Figs. 1 and 2 of the drawings, 1 indicates a frame, which may consist of a pair of semicircular pieces 2, united to a rectangular frame 3 by any suitable means and provided with a handle 4.

5 indicates a horizontal rib, which preferably carries a suitable number of strippers 6, that consist, preferably, of wire bent in suitable form and provided with beveled ends 7.

8 indicates a suitable stay for keeping the wires rigid upon the frame. In suitable bearings within the rectangular part of the frame is mounted a roller 9, which carries in regular order rows of sharp teeth 10. By rotation of the device over meat backward and forward the fibers will be cut and broken so as to accomplish the purpose intended, while the ends of the strippers, running between the rows of teeth, will keep the meat pressed back and prevent it from rolling around the roller and will also prevent particles of the meat being separated from the whole.

What I claim is—

The combination, with a meat-chopper, of a roller journaled in a frame provided with a suitable handle and having rows of teeth at regular intervals on its periphery, with a series of intermediate bent-wire bevel-ended strippers mounted on a horizontal rib, and suitable stays whereby they are retained in proper relative position, substantially as specified.

In testimony of all which I have hereunto subscribed my name.

JOHN JEFFERSON.

Witnesses:
C. E. STONE,
H. M. BUTLER.